US012692420B2

(12) United States Patent
Zhang et al.

(10) Patent No.: US 12,692,420 B2
(45) Date of Patent: Jul. 28, 2026

(54) ONE-COMPONENT AQUEOUS SPRAY ADHESIVE

(71) Applicant: Covestro Deutschland AG, Leverkusen (DE)

(72) Inventors: Chenxi Zhang, Shanghai (CN); Feng Zhu, Shanghai (CN); Ling Qiu, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 494 days.

(21) Appl. No.: 18/284,880

(22) PCT Filed: Mar. 28, 2022

(86) PCT No.: PCT/EP2022/058043

§ 371 (c)(1),
(2) Date: Sep. 29, 2023

(87) PCT Pub. No.: WO2022/207524

PCT Pub. Date: Oct. 6, 2022

(65) Prior Publication Data

US 2024/0182763 A1 Jun. 6, 2024

(30) Foreign Application Priority Data

Mar. 31, 2021 (CN) ......................... 202110353167.6
May 17, 2021 (EP) .................................... 21174015

(51) Int. Cl.

| | |
|---|---|
| ***C09J 5/00*** | (2006.01) |
| ***C08K 3/22*** | (2006.01) |
| ***C08K 5/103*** | (2006.01) |
| ***C08K 5/17*** | (2006.01) |
| ***C09J 11/04*** | (2006.01) |
| ***C09J 111/02*** | (2006.01) |

(52) U.S. Cl.

CPC ............... *C09J 111/02* (2013.01); *C08K 3/22* (2013.01); *C08K 5/103* (2013.01); *C08K 5/175* (2013.01); *C09J 5/00* (2013.01); *C09J 11/04* (2013.01); *C08K 2003/222* (2013.01); *C08K 2003/2296* (2013.01); *C08K 2201/011* (2013.01); *C09J 2411/00* (2013.01)

(58) Field of Classification Search

CPC ... C09J 5/00; C09J 111/02; C09J 11/04; C09J 2411/00; C08K 3/22; C08K 5/103; C08K 5/175; C08K 2003/222; C08K 2003/2296; C08K 2201/011

USPC .......................................................... 524/834

See application file for complete search history.

(56) References Cited

U.S. PATENT DOCUMENTS

| | | | | |
|---|---|---|---|---|
| 9,023,948 B2 | 5/2015 | Ohnishi | | |
| 2006/0069196 A1 | 3/2006 | Grabowski et al. | | |
| 2009/0053949 A1* | 2/2009 | Achten | C08K 3/36 | 428/441 |
| 2012/0138226 A1 | 6/2012 | Lorenz et al. | | |
| 2012/0160410 A1* | 6/2012 | Lorenz | C09J 5/04 | 156/307.3 |
| 2013/0123400 A1 | 5/2013 | Simmler-Bornhauser et al. | | |
| 2013/0245163 A1* | 9/2013 | Pantke | C08L 11/02 | 524/48 |

FOREIGN PATENT DOCUMENTS

| | | | |
|---|---|---|---|
| CN | 111662653 | A | 9/2020 |
| EP | 3260488 | A1 | 12/2017 |
| JP | 2000219859 | A | 8/2000 |
| JP | 2004197028 | A | 7/2004 |
| WO | 0134718 | A1 | 5/2001 |

* cited by examiner

*Primary Examiner* — Kelechi C Egwim
(74) *Attorney, Agent, or Firm* — Donald R. Palladino

(57) ABSTRACT

Provided is a one-component aqueous spray adhesive. The spray adhesive includes an aqueous chloroprene dispersion, where the increase of the Shore A hardness of the formed adhesive film in 0 to 10 hours accounts for equal to or more than 90% of the increase of the Shore A hardness of the formed adhesive film in 0 to 1000 hours; a styrene-acrylate copolymer dispersion having a solid content of 15% by weight to 25% by weight, relative to the total weight of solids of the aqueous chloroprene dispersion; a polyol ester without hydroxyl groups in an amount of 0.9% by weight to 3.8% by weight, relative to the total weight of the aqueous spray adhesive; and an amino acid in an amount of 4% by weight to 15% by weight, relative to the total weight of the aqueous chloroprene dispersion.

11 Claims, No Drawings

ONE-COMPONENT AQUEOUS SPRAY ADHESIVE

CROSS-REFERENCE TO RELATED APPLICATIONS

This application is the United States national phase of International Application No. PCT/EP2022/058043 filed Mar. 28, 2022, and claims priority to Chinese Patent Application No. 202110353167.6 filed Mar. 31, 2021 and European Patent Application No. 21174015.4 filed May 17, 2021, the disclosures of which are hereby incorporated by reference in their entireties.

BACKGROUND OF THE INVENTION

Field of the Invention

The invention relates to a one-component aqueous spray adhesive and use thereof, and a product comprising the one-component aqueous spray adhesive.

Description of Related Art

The spray adhesives used for bonding foam with foam or other substrates in soft furniture, transportation and other fields mainly include solvent-based styrene-butadiene-styrene block copolymer adhesives (hereinafter referred to as solvent-based SBS adhesives), solvent-based chloroprene adhesives, polyolefin-based hot melt adhesives and aqueous chloroprene adhesives.

The solvent-based SBS adhesives and the solvent-based chloroprene adhesives show short time to contact, but use mostly benzene series, ketones and chlorinated solvents, etc. as the solvent. Such solvents have a strong odor and are harmful to worker, cause environmental pollution and have potential safety hazards. In addition, the solvent-based SBS adhesives also have disadvantages of short open time, poor heat resistance, easy yellowing and chalking.

The polyolefin hot melt adhesives have the advantage of environmental protection, but the disadvantage of short open time. The polyolefin hot melt adhesives are prone to rebound phenomenon for bonding foams having relative high thickness and relative large rebound force. Their wetting and adhesion effect on substrates such as foams is worse than that of solvent-based SBS adhesives and aqueous chloroprene adhesives.

The aqueous chloroprene adhesives include one-component aqueous chloroprene adhesives and two-component aqueous chloroprene adhesives. The time to contact performance of the two-component aqueous chloroprene adhesives are comparable to that of solvent-based SBS adhesives, but show short open time, high requirements on the precision of the spraying equipment, strict requirements on the ratio of the two components, and high requirements on the operation of on-site workers. In addition, the investment cost of the spraying equipment for two-component aqueous chloroprene adhesives is relative high, and component B is prone to blocking the spraying equipment, greatly limiting the wide use of the two-component aqueous chloroprene adhesives. The one-component aqueous chloroprene adhesives are easy to operate, but show long time to contact.

In order to shorten the time contact of the one-component aqueous chloroprene adhesives, a plasticizer can be added into the adhesive. For example, plasticizers such as phthalates and aliphatic dibasic acid esters are used in the one-component aqueous chloroprene adhesives to shorten the time to contact. JP2000219859A2 mentions the use of dibutyl phthalate (DBP) and dibutyl sebacate (DBS). JP2004197028A2 mentions the use of dibutyl phthalate (DBP). WO0134718C2 mentions the use of diisobutyl phthalate (DIBP). U.S. Pat. No. 9,023,948B2 mentions the use of plasticizers such as dialkyl phthalates, dialkyl adipates and dialkyl sebacates in the aqueous chloroprene adhesives. The above plasticizers have problems in terms of safety, environmental protection or degradability, and have poor solubility and dispersibility in the aqueous chloroprene adhesives, and are prone to problems such as phase separation, skinning, particle generation and gelation when used in the aqueous chloroprene adhesives with a high crystallization speed.

Therefore, it is desired to develop a one-component aqueous chloroprene adhesive with short time to contact, storage stability and excellent sprayability in the industry.

SUMMARY OF THE INVENTION

Objects of the present invention are to provide a one-component aqueous spray adhesive and use thereof, and a product comprising the one-component aqueous spray adhesive.

The one-component aqueous spray adhesive of the present invention comprises:

a. an aqueous chloroprene dispersion, wherein the increase of the Shore A hardness of the formed adhesive film in 0 to 10 hours accounts for equal to or more than 90% of the increase of the Shore A hardness of the formed adhesive film in 0 to 1000 hours, wherein the increase of the respective Shore A hardness of the formed adhesive film is determined according to the method identified below;
b. a styrene-acrylate copolymer dispersion having a solid content of 15% by weight to 25% by weight, relative to the total weight of solids of the aqueous chloroprene dispersion;
c. a polyol ester without hydroxyl groups in an amount 0.9% by weight to 3.8% by weight, relative to the total weight of the aqueous spray adhesive;
d. an amino acid in an amount of 4% by weight to 15% by weight, relative to the total weight of the aqueous chloroprene dispersion;
e. optionally, a nanosized metal oxide; and
f. optionally, an auxiliary agent.

One aspect of the present invention is to provide the use of the one-component aqueous spray adhesive according to the present invention for preparing bonded products.

Another aspect of the present invention is to provide the use of the one-component aqueous spray adhesive according to the present invention for bonding foams.

Still another aspect of the present invention is to provide a product comprising a substrate bonded or sealed with the one-component aqueous spray adhesive according to the present invention.

Yet another aspect of the present invention is to provide a bonding method comprising I. applying the one-component aqueous spray adhesive according to the present invention to at least one surface of a substrate; and
II. bring the surface of the substrate treated in step I into contact with a surface of the substrate itself or of another substrate.

Yet another aspect of the present invention is to provide a bonded product prepared by the bonding method according to the present invention.

Yet another aspect of the present invention is to provide a product comprising a substrate and a coating formed by applying the one-component aqueous spray adhesive of the present invention to the substrate and curing.

Yet another aspect of the present invention is to provide a method for preparing the one-component aqueous spray adhesive of the present invention comprising mixing the component a) an aqueous chloroprene dispersion, component b) a styrene-acrylate copolymer dispersion, component c) a polyol ester without hydroxyl group, component d) an amino acid, optionally component e) a nanosized metal oxide, and optionally component f) an auxiliary agent in any manner.

The aqueous chloroprene dispersion with a high crystallization speed contained in the one-component aqueous spray adhesive of the present invention helps to shorten the time to contact of the spray adhesive. The styrene-acrylate copolymer dispersion helps to shorten the time to contact, extend the open time and provide storage stability at room temperature. The polyol esters without hydroxyl groups and the amino acid help to improve the storage stability of the spray adhesive without affecting on the time to contact performance thereof. The spray adhesive of the present invention shows excellent sprayability, safety and environmental protection, short time to contact, long open time, excellent storage stability at room temperature, and the surface of the adhesive layer formed by the spray adhesive is dry. The short time to contact performance ensures that the spray adhesive can be used for bonding in a relative short time and improves the adhesion efficiency. The spray adhesive of the present invention is particularly suitable for the adhesion of geometry surfaces. The long open time can ensure the long operation time of the spray adhesive. The spray adhesive of the present invention can be sprayed on a large area at one time. The spray adhesive of the present invention is particularly suitable for rapidly bonding foams with foams or other substrates.

The one-component aqueous spray adhesive of the present invention can be used in the fields of soft furniture, transportation and the like.

DESCRIPTION OF THE INVENTION

The present invention provides a one-component aqueous spray adhesive comprising a. an aqueous chloroprene dispersion, wherein the increase of the Shore A hardness of the formed adhesive film in 0 to 10 hours accounts for equal to or more than 90% of the increase of the Shore A hardness of the formed adhesive film in 0 to 1000 hours, wherein the increase of the respective Shore A hardness of the formed adhesive film is determined according to the method identified below; b. a styrene-acrylate copolymer dispersion having a solid content of 15% by weight to 25% by weight, relative to the total weight of solids of the aqueous chloroprene dispersion; c. a polyol ester without hydroxyl groups in an amount 0.9% by weight to 3.8% by weight, relative to the total weight of the aqueous spray adhesive; d. an amino acid in an amount of 4% by weight to 15% by weight, relative to the total weight of the aqueous chloroprene dispersion; e. optionally, a nanosized metal oxide; and f. optionally, an auxiliary agent. The present invention also provides the use of the one-component aqueous spray adhesive, a product comprising a substrate bonded or sealed with the one-component aqueous spray adhesive, and a bonding method for the one-component aqueous spray adhesive.

One-Component Aqueous Spray Adhesive

The pH value of the one-component aqueous spray adhesive is preferably of 7.0-9.0, most preferably 7.6-8.0.

Aqueous Chloroprene Dispersion of Component a)

The wording "equal to or more than" and "equal to or less than" used herein means to include the number itself.

The solid content of the aqueous chloroprene dispersion of component a) is preferably 30% by weight to 80% by weight, most preferably 50% by weight to 60% by weight, relative to the total weight of the aqueous chloroprene dispersion of component a).

The aqueous chloroprene dispersion is preferably in an amount of 70% by weight to 80% by weight, relative to the total weight of the spray adhesive.

The aqueous chloroprene dispersion of component a) is preferably a linear polymer having the structure I obtained by polyaddition of 2-chloro-1,3-butadiene monomer,

I

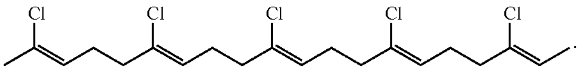

The Shore A hardness and the increase of the Shore A hardness of the adhesive film is tested as follows:

The aqueous chloroprene dispersion is poured into a tetrafluoroethylene tray, and dried at room temperature for 7 days to obtain an adhesive film with a thickness of 2 mm. Then, 3 sheets of the 2 mm adhesive film are stacked together and placed in an oven at 90° C. for 1 hour for decrystallization. After being taken out and stored for a certain period of time, the adhesive film is tested for the Shore A hardness under a condition at −5° C. The results are recorded as the Shore A hardness of the adhesive film at the corresponding time. The Shore A hardness of an adhesive film is tested under a condition at −5° C. immediately after being taken out from the oven, and the result is recorded as the Shore A hardness of the adhesive film at 0 hour, while the Shore A hardness of another adhesive film is tested under a condition at −5° C. after being taken out from the oven and stored at room temperature for 10 hours, and the result is recorded as the Shore A hardness of the adhesive film at 10 hour, while the Shore A hardness of another adhesive film is tested under a condition at −5° C. after being taken out from the oven and stored at room temperature for 1000 hours, and the result is recorded as the Shore A hardness of the adhesive film at 1000 hour, and so on.

If the increase of the Shore A hardness of the adhesive film formed by the aqueous chloroprene dispersion in 0 to 10 hours accounts for equal to or more than 90% of that in 0 to 1000 hours, the crystallization speed of the aqueous chloroprene dispersion is deemed to be fast.

If the increase of the Shore A hardness of the adhesive film formed by the aqueous chloroprene dispersion in 0 to 10 hours accounts for less than 90% of that in 0 to 1000 hours, and that in 0 to 100 hours accounts for equal to or more than 90% of that in 0 to 1000 hours, the crystallization speed of the aqueous chloroprene dispersion is deemed to be medium.

If the increase of the Shore A hardness of the adhesive film formed by the aqueous chloroprene dispersion in 0 to 10 hours accounts for less than 90% of that in 0 to 1000 hours, and that in 0 to 100 hours accounts for less than 90% of that in 0 to 1000 hours, the crystallization speed of the aqueous chloroprene dispersion is deemed to be low.

The increase of the Shore A hardness of the adhesive film in 0 to 10 hours refers to the value obtained by subtracting the Shore A hardness of the film at 0 hour from that at 10 hours. The increase of the Shore A hardness of the adhesive film in 0 to 100 hours refers to the value obtained by subtracting the Shore A hardness of the film at 0 hour from that at 100 hours. The increase of the Shore A hardness of the adhesive film in 0 to 1000 hours refers to the value obtained by subtracting the Shore A hardness of the adhesive film at 0 hour from that at 1000 hours.

The aqueous chloroprene dispersion has preferably pH value of 10 to 14.

Styrene-Acrylate Copolymer Dispersion of Component)

The glass transition temperature of the styrene-acrylate copolymer dispersion is preferably −10° C. to 30° C., most preferably 10° ° C. to 19° C., obtained by measuring the first heating curve at a heating rate of 20K/min by differential scanning calorimetry (DSC) according to DIN65467.

The styrene-acrylate copolymer dispersion has preferably a solid content of 40% by weight to 60% by weight, relative to the total weight of the styrene-acrylate copolymer dispersion.

The pH value of the styrene-acrylate copolymer dispersion is preferably 7.5-9.5, measured at 23° C. with PB-10 pH meter from Sartorius, Germany.

Polyol Ester without Hydroxyl Groups of Component c)

The polyol ester without hydroxyl groups is in an amount of 0.9% by weight to 2.9% by weight, most preferably 0.9% by weight to 2% by weight, relative to the total weight of the one-component aqueous spray adhesive.

The polyol ester without hydroxyl groups is preferably 2,2,4-trimethyl-1,3-pentanediol diisobutyrate.

Amino Acid of Component d)

The amino acid of component d) is preferably glycine.

The amino acid is preferably in an amount of 4% by weight to 12% by weight, most preferably 4% by weight to 10% by weight, relative to the total weight of the aqueous chloroprene dispersion.

Nanosized Metal Oxide of Component e)

The nanosized metal oxide is preferably one or more of nanosized zinc oxide powder, nanosized zinc oxide dispersion, nanosized magnesium oxide powder and nanosized magnesium oxide dispersion; more preferably one or more of nanosized zinc oxide powder and nanosized zinc oxide dispersion; and most preferably nanosized zinc oxide dispersion.

The nanosized metal oxide is preferably in an amount of 0.1% by weight to 5% by weight, relative to the total weight of the one-component aqueous spray adhesive.

Auxiliary Agent of Component f)

The auxiliary agent is preferably one or more of antioxidants, light stabilizers, UV absorbers, thickeners, defoaming agent, fillers, defoamers and pigments.

The antioxidant is in an amount of 0.1% by weight to 5% by weight, most preferably 0.5% by weight to 3% by weight, relative to the total weight of the one-component aqueous spray adhesive.

The light stabilizer and the UV absorber are each independently preferably in an amount of 0.01% by weight to 5% by weight, most preferably 0.5% by weight to 3% by weight, relative to the total weight of the one-component aqueous spray adhesive.

The thickener is preferably one or more of polyurethane associative thickeners, acrylic alkali soluble thickeners and cellulose thickeners, most preferably acrylic alkali soluble thickeners.

The filler is preferably one or more of silica, kaolin and calcium carbonate, and most preferably one or more surface-treated kaolin and surface-treated silica.

Product

The product is preferably soft furniture, most preferably sofa, mattress, car seat or train seat.

Bonding Method

Between step I and step II, the method preferably further comprises a step III: heating and drying the surface of the substrate to which the one-component aqueous spray adhesive is applied.

Between step II and step III, the method preferably further comprises a step IV: irradiating the surface of the substrate treated in step III with actinic radiation.

The substrate is preferably one or more of woods, plastics, metals, glasses, textiles, alloys, fabrics, artificial leathers, papers, cardboards, EVA, rubbers, real leathers, glass fibers, ethylene vinyl acetate copolymers, polyolefins, thermoplastic polyurethanes, foams, polymer fibers and graphite fibers, most preferably one or more of polyurethane foams.

The application may be applying the one-component aqueous spray adhesive to the entire surface of the substrate or only to one or more parts of the surface of the substrate.

The application may be brush coating, dip coating, spray coating, roll coating, blade coating, flow coating, casting, printing or transfer printing, preferably brush coating, roll coating or spray coating.

Heating and drying the surface of the substrate to which the one-component aqueous spray adhesive is applied may refer to only heating and drying the surface of the substrate, or refer to heating and drying a part of the substrate or the entire substrate including the surface of the substrate to which the one-component aqueous spray adhesive is applied.

The heating and drying can remove volatile components. The volatile components may be water.

The heating and drying is carried out by preferably one or more of infrared thermal radiation, near-infrared thermal radiation, microwave, and convection oven or spray dryer under elevated temperature.

EXAMPLES

Unless defined otherwise, all technical and scientific terms used herein have the same meaning as commonly understood by those skilled in the art. When the definition of a term in the specification conflicts with the meanings commonly understood by those skilled in the art, the definition described herein shall apply.

Unless indicated otherwise, all numbers expressing quantities of ingredients, reaction conditions and the like used in the specification and claims are to be understood as being modified by the wording "about". Accordingly, the numerical parameters set forth herein are approximations that can vary depending upon the desired properties to be obtained, unless indicated to the contrary.

The wording "and/or" used herein refers to one or all of the cited elements.

The wording "include" and "comprise" used herein cover the presence of the mentioned elements alone and the presence of other elements not mentioned in addition to the mentioned elements.

All percentages in the present invention are weight percentages, unless otherwise stated.

The analysis and measurement in the present invention are performed at (23±2° C.), unless otherwise stated.

Unless otherwise indicated, the wordings "a", "an", and "the" used herein are intended to include "at least one" or "one or more". For example, the wording "a component" refers to one or more components, therefore more than one component may be considered and may be adopted or used in the implementation of the described embodiments.

The solids content (solid content) of the dispersions is measured using HS153 moisture analyzer from Mettler Toledo in accordance with DIN-EN ISO 3251.

Raw Materials and Agents

Dispercoll C 84: Aqueous chloroprene dispersion, with a fast crystallization speed (measured as identified above), a solid content of 55% by weight, and pH value of 11-13, available from Covestro Germany.

FB80: Aqueous chloroprene dispersion, with a fast crystallization speed (measured as identified above), a solid content of 54% by weight, and pH value of 11-13, available from Denka, Japan.

Dispercoll C 74: Aqueous chloroprene dispersion, with a medium crystallization speed (measured as identified above), a solid content of 58% by weight, and pH value of 13, available from Covestro Germany.

Revacryl X 9045: Styrene-acrylate emulsion with Tg of 12° C., a solid content of 50% by weight, and pH value of 8.0, available from Shanghai Synthomer Chemical Co., Ltd.

PRIMAL AS-2010: Styrene-acrylate emulsion with Tg of 17° C., a solid content of 49% by weight, and pH value 7.8, available from Dow Chemicals.

MC-202: Styrene-acrylate emulsion with Tg of 18.5° C., a solid content of 47% by weight, and pH value of 9.0, available from Beijing Oriental Acrylic Chemical Technology Co., Ltd.

DERMULSENE TR 602: Terpene phenolic resin with a solid content of 55% by weight, and pH value of 8.0, available from Wuxi DRT Chemical Co., Ltd.

DERMULSENE RA 702: Rosin with a solid content of 52% by weight, and pH value of 7.0, available from Wuxi DRT Chemical Co., Ltd.

Acronal 7140X: Styrene-butadiene emulsion with a solid content of 61% by weight, and pH value of 7.0, available from BASF.

Eastman TXIB: 2,2,4-trimethyl-1,3-pentanediol diisobutyrate, available from Eastman Chemical. 2,2,4-trimethyl-1,3-pentanediol monoisobutyrate, available from Eastman Chemical.

Dibutyl sebacate (DBS): available from Yonghua Chemical Co., Ltd.

Dibutyl phthalate (DBP): available from Yonghua Chemical Co., Ltd.

Diisobutyl phthalate (DIBP): available from Yonghua Chemical Co., Ltd.

Dibutyl terephthalate (DBT): available from Yonghua Chemical Co., Ltd.

Dioctyl terephthalate (DOTP): available from Yonghua Chemical Co., Ltd.

TSR-1068: Antioxidant, available from Tongxuan Lixin Chemical Co., Ltd.

Dnano-233W-30WS: Stabilizer, available from Xiamen NMT Technology Co., Ltd.

Glycine: pH adjustment agent, available from Jizhou Huayang Chemical Co., Ltd.

Boric acid: pH adjustment agent, available from Yonghua Chemical Co., Ltd.

Test Method for Performance of the Spray Adhesives pH value: The spray adhesives are placed in a water bath with constant temperature at 23° C., and tested with 913 pH meter from Metrohm when the temperature is constant at (23±2° C.)

Phase separation after being left at room temperature for 1 day: The prepared spray adhesive samples are sealed and stored in a glass bottle for 1 day at ambient temperature of (23±2° C.), and observed for phase separation in the appearance of the samples. No phase separation is regarded as qualified, and the occurrence of phase separation is regarded as unqualified.

Storage stability at room temperature: The prepared spray adhesive samples are sealed and stored in a glass bottle at ambient temperature of (23±2° C.) The spray adhesives are observed whether layering or gelation occurs in the appearance of the spray adhesives every month, and filtered through a 100 mesh filter to check whether the filtering is smooth and whether there are particles or agglomerations on the filter. If the spray adhesive samples are stored at ambient temperature of (23±2)° ° C. for 6 months and no layering or gelation occurs in the appearance, and can be filtered quickly through a 100 mesh filter, and there are no particles or agglomerations on the filter, it is regarded as qualified, otherwise as unqualified.

Time to contact: The foams to be tested are highly resilient polyurethane foams with a size of 9 cm×6 cm×5 cm and a density of about 46 kg/$m^3$. The spray adhesive are sprayed in an amount of 50 g/$m^2$-60 g/$m^2$ on the surface of the foams with a size of 9 cm×6 cm. The foams are pressed and bonded with each other from the left side along the edge of 6 cm. If the foams don't bounce off, it is continued to bond them to the right side and the above operation is repeated. The shortest time at which the foams don't bounce off during the entire bonding and are fully bonded is recorded as the time to contact. The time to contact of not more than 20 s is regarded as qualified, otherwise as unqualified.

Open time: The foams to be tested are highly resilient polyurethane foams with a size of 9 cm×6 cm×5 cm and a density of about 46 kg/$m^3$. The spray adhesives are sprayed in an amount of 50 g/$m^2$-60 g/$m^2$ on the surface of the foams with a size of 9 cm×6 cm. The foams are pressed and bonded with each other from the left side along the edge of 6 cm. If the foams don't bounce off, it is continued to bond them to the right side and the above operation is repeated. The foams don't bounce off during the entire bonding and are fully bonded. After the bonded foams are left to stand for a period of time, the bonded part of the foams are torn by hand. If it is torn apart at the bonded part, the standing time is recorded as the open time. If it is not torn apart at the bonded part and the material of the foams is broken, the foams are allowed to continue to stand until it can be torn apart at the bonded part. The total standing time of the foams is recorded as the open time. The open time of not less than 20 min is regarded as qualified, otherwise as unqualified.

The time to contact and the open time are tested at 23° C. and 60% RH.

Table 1 shows the composition and results of tests and evaluation for performance of the spray adhesives of Examples 1-5 and Comparative Examples 1-7. Table 2 shows the composition and results of tests and evaluation for performance of the spray adhesives of Examples 5-10 and Comparative Examples 8-16.

TABLE 1

Spray adhesives of Examples 1-5 and Comparative Examples 1-7

| Composition of spray adhesives/g | Comp. Ex. 1 | Comp. Ex. 2 | Comp. Ex. 3 | Comp. Ex. 4 | Comp. Ex. 5 | Comp. Ex. 6 | Comp. Ex. 7 | Ex. 1 | Ex. 2 | Ex. 3 | Ex. 4 | Ex. 5 |
|---|---|---|---|---|---|---|---|---|---|---|---|---|
| Dispercoll C 74 | 77.56 | | | | | | | | | | | |
| Dispercoll C 84 | | 80.62 | 79.88 | 81.92 | 86.40 | 71.87 | 78.47 | 78.47 | | 78.90 | 82.25 | 75.03 |
| FB80 | | | | | | | | | 78.78 | | | |
| TSR-1068 | 1.80 | 1.77 | 1.76 | 1.80 | 1.90 | 1.58 | 1.90 | 1.73 | 1.70 | 1.74 | 1.81 | 1.65 |
| Dnano-233W-30WS | 1.50 | 1.48 | 1.46 | 1.50 | 1.58 | 1.32 | 1.58 | 1.44 | 1.42 | 1.45 | 1.51 | 1.38 |
| DERMULSENE TR 602 | | 16.12 | | | | | | | | | | |
| DERMULSENE RA 702 | | | 16.90 | | | | | | | | | |
| Acronal 7140X | | | | 14.77 | | | | | | | | |
| Revacryl X 9045 | | | | | | | | | | 8.68 | | |
| MC-202 | 19.14 | | | | 10.11 | 25.23 | 10.11 | 18.37 | 18.10 | 9.23 | 14.44 | 21.95 |
| Eastman TXIB | 2.00 | 2.00 | 2.00 | 2.00 | 2.00 | 2.00 | 2.00 | 2.00 | 2.00 | 2.00 | 2.00 | 2.00 |
| Glycine | 3.18 | 3.31 | 3.28 | 3.36 | 3.54 | 2.95 | | 3.22 | 3.23 | 3.33 | 3.37 | 3.08 |
| Boric acid | | | | | | | 3.22 | | | | | |
| Total/g | 105.18 | 105.30 | 105.28 | 105.35 | 105.53 | 104.95 | 105.23 | 105.23 | 105.23 | 105.33 | 105.38 | 105.09 |
| Solid content of the styrene-acrylate copolymer dispersions /% by weight | 20 | 20 | 20 | 20 | 10 | 30 | 20 | 20 | 20 | 20 | 15 | 25 |
| Amount of amino acid or boric acid/% by weight | 4.1 | 4.1 | 4.1 | 4.1 | 4.1 | 4.1 | 4.1 | 4.1 | 4.1 | 4.2 | 4.1 | 4.1 |
| Tests and evaluation for performance of spray adhesives | | | | | | | | | | | | |
| pH value | 8.09 | 7.78 | 7.86 | 7.85 | 7.74 | 8.01 | 7.75 | 7.79 | 7.88 | 7.93 | 7.86 | 7.60 |
| Phase separation of spray adhesives after being left to stand at room temperature for 1 day | qualified | qualified | qualified | qualified | qualified | qualified | qualified | qualified | qualified | qualified | qualified | qualified |
| Storage stability at room temperature | qualified | qualified | qualified | unqualified | unqualified | qualified | unqualified | qualified | qualified | qualified | qualified | qualified |
| Time to contact/s | 60 | 30 | 150 | 50 | 10 | 30 | 10 | 15 | 20 | 10 | 10 | 15 |
| Opening time/min | >30 | <15 | <15 | <15 | 20 | >30 | 25 | 30 | >30 | 25 | 25 | 30 |

Notes:

1. The solid content of the styrene-acrylate copolymer dispersions refers to that relative to the total weight of solids of the aqueous chloroprene dispersion, i.e. the weight percentage of solids of the styrene-acrylate copolymer dispersion. When the spray adhesives comprise no styrene-acrylate copolymer dispersion, the value refers to the weight percentage of solids of the terpene phenolic resin, the rosin and the styrene-butadiene emulsion in the spray adhesives relative to the total weight of solids of the aqueous chloroprene dispersion;

2. The amount of amino acid refers to the weight percentage of the amino acid, relative to the total weight of the aqueous chloroprene dispersion;

3. The amount of boric acid refers to the weight percentage of the boric acid, relative to the total weight of the aqueous chloroprene dispersion.

The one-component aqueous spray adhesives of Examples 1-5 of the present invention have the storage stability at room temperature, the time to contact and the open time, which are all qualified.

It can be seen from the comparison of Comparative Example 1 and Examples 1-2 that the aqueous chloroprene dispersion contained in the aqueous spray adhesive of Comparative Example 1 has a medium crystallization speed. Its time to contact is 60 s, which is unqualified. As a result, it is found that it would significantly helpful for the time to contact performance of the spray adhesives by choosing an aqueous chloroprene dispersion with a fast crystallization speed.

It can be seen from the comparison of Comparative Examples 2-4 and Examples 1-3 that the spray adhesives of Comparative Examples 2-4 comprising the terpene phenolic resin, the rosin and the styrene-butadiene emulsion have the time to contact and the open time, which are all unqualified, and the storage stability at room temperature of the spray adhesive of Comparative Example 4 is unqualified. As a result, it is found that the time to contact performance, the open time and the storage stability at room temperature of the spray adhesives can be improved by choomedoumsing styrene-acrylate copolymer dispersion.

It can be seen from the comparison of Comparative Examples 5-6 and Examples 1 and 4-5 that the aqueous spray adhesives in Comparative Examples 5-6 with a solid content of the styrene-acrylate copolymer dispersion of 10% by weight and 30% by weight, relative to the total weight of solids of the aqueous chloroprene dispersion, can't show the qualified time to contact, the qualified open time, and the qualified storage stability at room temperature at the same time. As a result, it is found that the time to contact performance, the open time and the storage stability at room temperature can be improved by adjusting the solid content of the styrene-acrylate dispersion in the spray adhesive.

It can be seen from the comparison of Comparative Example 7 and Examples 1-5 that the aqueous spray adhesive of Comparative Example 7 comprising boric acid has unqualified storage stability at room temperature. It is found that the glycine in the spray adhesive can improve its storage stability at room temperature.

TABLE 2

Composition and performance of the spray adhesives of Examples 5-10 and Comparative Examples 8-16

| Composition of spray adhesives/g | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|
| Dispercoll C 84 | 75.03 | 75.03 | 75.03 | 75.03 | 75.03 | 75.03 | 75.03 | 79.20 |
| TSR-1068 | 1.65 | 1.65 | 1.65 | 1.65 | 1.65 | 1.65 | 1.65 | 1.74 |
| Dnano-233W-30WS | 1.38 | 1.38 | 1.38 | 1.38 | 1.38 | 1.38 | 1.38 | 1.45 |
| Revacryl X9045 | | | | | | | | 8.71 |
| PRIMAL AS-2010 | | | | | | | | 8.89 |
| MC-202 | 21.95 | 21.95 | 21.95 | 21.95 | 21.95 | 21.95 | 21.95 | |
| Eastman TXIB | 5.00 | | | | | | | 2.00 |
| 2,2,4-trimethyl-1,3-pentanediol monoisobutyrate | | 2.00 | | | | | | |
| Dibutyl sebacate (DBS) | | | 2.00 | | | | | |
| Dibutyl phthalate (DBP) | | | | 2.00 | | | | |
| Diisobutyl phthalate (DIBP) | | | | | 2.00 | | | |
| Dibutyl terephthalate (DBT) | | | | | | 2.00 | | |
| Dioctyl terephthalate (DOTP) | | | | | | | 2.00 | |
| Glycine | 3.08 | 3.08 | 3.08 | 3.08 | 3.08 | 3.08 | 3.08 | 2.50 |
| Total/g | 108.09 | 105.09 | 105.09 | 105.09 | 105.09 | 105.09 | 105.09 | 104.49 |
| Solid content of the styrene-acrylate copolymer dispersions/% by weight | 25 | 25 | 25 | 25 | 25 | 25 | 25 | 20 |
| Amount of amino acid/% by weight | 4.1 | 4.1 | 4.1 | 4.1 | 4.1 | 4.1 | 4.1 | 3.2 |
| | Tests and evaluation for performance of spray adhesives | | | | | | | |
| pH value | 7.86 | 7.91 | / | 7.87 | 7.78 | / | / | 8.00 |
| Phase separation of spray adhesives after being left to stand at room temperature for 1 day | qualified | qualified | unqualified | qualified | qualified | unqualified | unqualified | qualified |
| Storage stability at room temperature | unqualified | unqualified | / | unqualified | unqualified | / | / | unqualified |
| Time to contact/s | 10 | 25 | / | 15 | 15 | / | / | 10 |
| Opening time/min | 25 | 20 | / | 20 | 20 | / | / | 25 |

| Composition of spray adhesives/g | Comp. Ex. 16 | Ex. 5 | Ex. 6 | Ex. 7 | Ex. 8 | Ex. 9 | Ex. 10 |
|---|---|---|---|---|---|---|---|
| Dispercoll C 84 | 78.90 | 75.03 | 75.03 | 75.03 | 79.20 | 78.90 | 78.90 |
| TSR-1068 | 1.74 | 1.65 | 1.65 | 1.65 | 1.74 | 1.74 | 1.74 |
| Dnano-233W-30WS | 1.45 | 1.38 | 1.38 | 1.38 | 1.45 | 1.45 | 1.45 |
| Revacryl X9045 | 8.68 | | | | 8.71 | 8.68 | 8.68 |
| PRIMAL AS-2010 | | | | | 8.89 | | |
| MC-202 | 9.23 | 21.95 | 21.95 | 21.95 | | 9.23 | 9.23 |
| Eastman TXIB | 2.00 | 2.00 | 1.00 | 3.00 | 2.00 | 2.00 | 2.00 |
| 2,2,4-trimethyl-1,3-pentanediol monoisobutyrate | | | | | | | |
| Dibutyl sebacate (DBS) | | | | | | | |
| Dibutyl phthalate (DBP) | | | | | | | |
| Diisobutyl phthalate (DIBP) | | | | | | | |
| Dibutyl | | | | | | | |

TABLE 2-continued

Composition and performance of the spray adhesives of Examples 5-10 and Comparative Examples 8-16

| | | | | | | | |
|---|---|---|---|---|---|---|---|
| terephthalate (DBT) | | | | | | | |
| Dioctyl terephthalate (DOTP) | | | | | | | |
| Glycine | 2.50 | 3.08 | 3.08 | 3.08 | 7.92 | 3.33 | 7.89 |
| Total/g | 104.50 | 105.09 | 104.09 | 106.09 | 109.91 | 105.33 | 109.89 |
| Solid content of the styrene-acrylate copolymer dispersions/ % by weight | 20 | 25 | 25 | 25 | 20 | 20 | 20 |
| Amount of amino acid/% by weight | 3.2 | 4.1 | 4.1 | 4.1 | 10.0 | 4.2 | 10.0 |
| | Tests and evaluation for performance of spray adhesives | | | | | | |
| pH value | 8.03 | 7.60 | 7.92 | 7.86 | 7.61 | 7.93 | 7.63 |
| Phase separation of spray adhesives after being left to stand at room temperature for 1 day | qualified | qualified | qualified | qualified | qualified | qualified | qualified |
| Storage stability at room temperature | unqualified | qualified | qualified | qualified | qualified | qualified | qualified |
| Time to contact/s | 10 | 15 | 15 | 10 | 10 | 10 | 10 |
| Opening time/min | 20 | 30 | 30 | 30 | 30 | 25 | >30 |

Notes:

1. The solid content of the styrene-acrylate copolymer dispersions refers to that relative to the total weight of solids of the aqueous chloroprene dispersion, i.e. the weight percentage of solids of the styrene-acrylate copolymer dispersion;
2. The amount of amino acid refers to the weight percentage of the amino acid, relative to the total weight of the aqueous chloroprene dispersion;
3. "/" means that the spray adhesives show phase separation after being left to stand at room temperature for 1 day, so that the pH value, the storage stability at room temperature, the time to contact and the open time cannot be tested.

The one-component aqueous spray adhesives of Examples 5-10 of the present invention have the time to contact, the open time and the storage stability at room temperature, which are all qualified.

It can be seen from the comparison of Comparative Example 8 and Examples 5-7 that the aqueous spray adhesive of Comparative Example 8 comprising more than 3.8% by weight pf the polyol ester without hydroxyl groups, relative to the total weight of the aqueous spray adhesive, has the short time to contact, but the unqualified storage stability at room temperature. As a result, it is found that an appropriate amount of the polyol ester without hydroxyl groups in the spray adhesive can improve the storage stability at room temperature of the spray adhesives.

It can be seen from the comparison of Comparative Examples 9-14 and Examples 5-7 that the aqueous spray adhesives of Comparative Examples 9-14 comprising 2,2,4-trimethyl-1,3-pentanediol monoisobutyrate, dibutyl sebacate, phthalates or terephthalates can't have the qualified time to contact, the qualified open time and the qualified storage stability at room temperature of the spray adhesives at the same time. The spray adhesives of Comparative Examples 10, 13 and 14 show phase separation after being left to stand for 1 day at room temperature, so that the time to contact, the open time and the storage stability at room temperature cannot be tested. It is found by the comparison that an appropriate amount of the polyol ester without hydroxyl groups in the spray adhesives can improve the time to contact, the open time and the storage stability at room temperature thereof.

It can be seen from the comparison of Comparative Example 15-16 and Examples 8-10 that the aqueous spray adhesives of Comparative Example 15-16 comprising equal to or less than 3.8% by weight of glycine, relative to the aqueous chloroprene dispersion, have the unqualified storage stability at room temperature.

It is found by comparison that by adding an appropriate amount of glycine thereto, the spray adhesives not only have short time to contact and long open time, but also qualified storage stability at room temperature.

Those skilled in the art will readily understand that the present invention is not limited to the foregoing details, and can be implemented in other specific forms without departing from the spirit or main characteristics of the present invention. Therefore, the examples should be regarded as illustrative rather than restrictive from any point of view, so that the scope of the present invention is illustrated by the claims rather than the foregoing description. Therefore, any change shall be regarded as belonging to the present invention, as long as it falls into the meaning and scope of equivalents of the claims.

The invention claimed is:

1. A one-component aqueous spray adhesive comprising a. an aqueous chloroprene dispersion, wherein an increase of Shore A hardness of a formed adhesive film in 0 to 10 hours accounts for equal to or more than 90% of the increase of the Shore A hardness of the formed adhesive film in 0 to 1000 hours;

b. a styrene-acrylate copolymer dispersion having a solid content of 15% by weight to 25% by weight, relative to total weight of solids of the aqueous chloroprene dispersion;

c. a polyol ester without hydroxyl groups in an amount 0.9% by weight to 3.8% by weight, relative to the total weight of the aqueous spray adhesive;

d. an amino acid in an amount of 4% by weight to 15% by weight, relative to the total weight of the aqueous chloroprene dispersion;

e. optionally, a nanosized metal oxide; and f. optionally, an auxiliary agent.

2. The aqueous spray adhesive according to claim 1, wherein the amino acid of component d) is glycine.

3. The aqueous spray adhesive according to claim 1, wherein the amino acid is in an amount of 4% by weight to 12% by weight relative to the total weight of the aqueous chloroprene dispersion.

4. The aqueous spray adhesive according to claim 1, wherein the aqueous chloroprene dispersion of component a) is a linear polymer having the structure I obtained by polyaddition of 2-chloro-1,3-butadiene monomer,

I

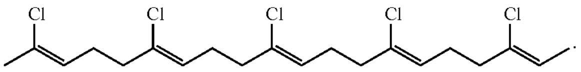

5. The aqueous spray adhesive according to claim 1, wherein the glass transition temperature of the styrene-acrylate copolymer dispersion is −10° C. to 30° C., obtained by measuring the first heating curve at a heating rate of 20K/min by differential scanning calorimetry (DSC) according to DIN65467.

6. The aqueous spray adhesive according to claim 1, wherein the polyol ester without hydroxyl groups is in an amount 0.9% by weight to 2.9% by weight, relative to the total weight of the aqueous spray adhesive.

7. The aqueous spray adhesive according to claim 1, wherein the polyol ester without hydroxyl groups is 2,2,4-trimethyl-1,3-pentanediol diisobutyrate.

8. The aqueous spray adhesive according to claim 1, wherein the nanosized metal oxide is one or more of nanosized zinc oxide powder, nanosized zinc oxide dispersion, nanosized magnesium oxide powder and nanosized magnesium oxide dispersion.

9. A method for preparing bonded products comprising providing the one-component aqueous spray adhesive according to claim 1.

10. A product comprising a substrate bonded or sealed with the one-component aqueous spray adhesive according to claim 1.

11. A bonding method comprising

I. applying the one-component aqueous spray adhesive according to claim 1 to at least one surface of a substrate; and II. bringing the surface of the substrate treated in step I into contact with a surface of the substrate itself or of another substrate.

* * * * *